United States Patent
Kawai et al.

(10) Patent No.: US 8,782,954 B2
(45) Date of Patent: Jul. 22, 2014

(54) GLASS RUN

(75) Inventors: Tatsuya Kawai, Kiyosu (JP); Yoshihisa Kubo, Kiyosu (JP); Yoshihiro Miura, Kiyosu (JP); Kentaro Adachi, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/618,408

(22) Filed: Sep. 14, 2012

(65) Prior Publication Data

US 2013/0074417 A1    Mar. 28, 2013

(30) Foreign Application Priority Data

Sep. 27, 2011  (JP) ................................. 2011-211437

(51) Int. Cl.
E06B 7/16   (2006.01)

(52) U.S. Cl.
USPC .......................... 49/475.1; 49/441; 49/490.1

(58) Field of Classification Search
None
See application file for complete search history.

(56) References Cited

U.S. PATENT DOCUMENTS

| | | | |
|---|---|---|---|
| 5,743,047 A | 4/1998 | Bonne et al. | |
| 6,205,712 B1 * | 3/2001 | Ellis | 49/441 |
| 6,557,304 B2 * | 5/2003 | Ellis | 49/441 |
| 6,668,490 B2 * | 12/2003 | Hock et al. | 49/502 |
| 6,679,003 B2 * | 1/2004 | Nozaki et al. | 49/441 |
| 8,166,708 B2 * | 5/2012 | Ellis et al. | 49/490.1 |
| 8,205,389 B1 * | 6/2012 | Kesh | 49/440 |
| 8,434,267 B2 * | 5/2013 | Bocutto | 49/479.1 |
| 2002/0108313 A1 * | 8/2002 | Nozaki et al. | 49/441 |
| 2005/0120634 A1 * | 6/2005 | Drivon et al. | 49/475.1 |
| 2011/0061307 A1 * | 3/2011 | Braeuherr | 49/475.1 |

FOREIGN PATENT DOCUMENTS

| | | | |
|---|---|---|---|
| JP | 07-195942 | 8/1995 | |
| JP | 07195942 A * | 8/1995 | B60J 5/00 |
| JP | 2005-247294 | 9/2005 | |
| JP | 2005247294 A * | 9/2005 | B60J 10/04 |
| JP | 2009-029265 | 2/2009 | |
| JP | 2009029265 A * | 2/2009 | |
| JP | 2010-018130 | 1/2010 | |
| JP | 2010018130 A * | 1/2010 | |

* cited by examiner

Primary Examiner — Katherine Mitchell
Assistant Examiner — Abe Massad
(74) Attorney, Agent, or Firm — McGinn IP Law Group, PLLC

(57) ABSTRACT

A glass run includes a glass run section, a trim section and a molding section. The glass run section is formed of a soft material, the trim section is formed of a hard material and the molding section is formed of a hard material by injection molding. The molding section includes a head part and a leg part, and has a generally T-shaped cross-section. A bottom wall of the trim section and an outer side wall of the glass run section are integrally joined to an interior surface of the head part of the molding section, while sandwiching the leg part of the molding section. A side wall of the trim section, is integrally joined to one of side surfaces of the leg part, whereas a bottom wall of the glass run section is integrally joined to the other side surface of the leg part.

11 Claims, 4 Drawing Sheets

GLASS RUN

CROSS-REFERENCE TO RELATED APPLICATION

This application is related to and claims priority from Japanese patent Application No. 2011-211437 incorporated herein by reference.

BACKGROUND OF THE INVENTION

1. Field of the Invention

The present invention relates to a glass run adapted to be attached to a door frame of a motor vehicle to provide a seal between a door opening portion and a vehicle door.

2. Description of Related Art

In order to provide a seal between a door opening portion and a vehicle door having a door sash, in one example of conventional seal structures, an opening trim weather strip is attached to a flange provided in the door opening portion, and a door weather strip is attached to an outer periphery of the door sash. When the vehicle door is closed, a tubular seal portion of the opening trim weather strip contacts a protrusion of the door sash, and a tubular seal portion and a seal lip of the door weather strip contact an outer panel of the door opening portion to seal a gap between the door opening portion and the vehicle door.

In this case, an end edge of the door glass is held with a glass run that is attached along an inner periphery of the door sash, and the door glass is raised and lowered in a channel provided in the glass run to have a generally U-shaped cross-section. This glass run effects a seal between the door glass and the door sash.

With this arrangement, the glass run, the door sash, and a center pillar are exposed around the door glass of a vehicle to degrade the external appearance of a side body of the vehicle so that it has been required to improve the design thereof. In addition, the glass run exists between the door sash and the door glass, and between the center pillar and the door glass so that gaps exist in an exterior surface between the door sash and the door glass, whereby the design of the side body is less preferable.

Under the above-described circumstances, as shown in FIG. 1, in a sashless door-type vehicle body, an exterior part of a door sash is removed so that only a door glass 10 is freely raised and lowered above the door belt line of a vehicle door 12. With this arrangement, in the side body of the motor vehicle, only the door glass 10 is visible above the door belt line of the vehicle door 12.

As shown in FIG. 2, a glass run 14 includes a glass run section 16 adapted to provide a seal between the door glass 10 and a door frame 18, and a trim section 20 adapted to attach the glass run 14 to a flange 22 extending along an end edge of the door frame 18 (see Japanese patent application laid-open No. 2005-247294, for example). The glass run section 16 has a main body with a generally U-shaped cross-section, which includes an outer side wall 24, an inner side wall 26 and a bottom wall 28. And an outer seal lip 30 and an inner seal lip 32 respectively extend from ends of the outer side wall 24 and the inner side wall 26 obliquely in an interior space of the main body. The outer seal lip 30 and the inner seal lip 32 provide a seal against the door glass 10.

The trim section 20 has a generally U-shaped cross-section, which includes a side wall 34 formed integrally with the bottom wall 28 of the glass run section 16, a side wall 36 formed on the side of a vehicle body, and a bottom wall 38. Seal lips 40 and 42 extend from the side wall 36 for contacting and sealing a door opening portion 44 when the vehicle door 12 is closed. A metal insert 45 having a generally U-shaped cross-section is embedded in the side walls 34 and 36 along with the bottom wall 38.

The glass run 14 thus arranged is formed linearly by extruding the glass run section 16 and the trim section 20 along with the metal insert 45 simultaneously.

Since the glass run 14 includes the metal insert 45, the weight thereof is great, thereby increasing the entire rigidity of the glass run 14. When the glass run 14 is attached along a curved outer periphery of an upper side of the door frame 18, it has been required to cut the extruded glass run 14 to have a short length, bend it to conform to curved surfaces of the door frame 18 and join it to another one.

And, when the glass run 14 is bent to conform to the curved surfaces of the door frame 18, wrinkles and waviness may occur in the surface of the glass run 14.

FIG. 3 illustrates another example of a conventional glass run. A glass run 46 includes a glass run section 48 adapted to provide a seal between the door glass 10 and the door frame 18, and a trim section 50 adapted to attach the glass run 46 to the flange 22 provided in the door frame 18, similarly to the case of the glass run 14 (FIG. 2). The glass run section 48 has a main body with a generally U-shaped cross-section, which includes an outer side wall 52, an inner side wall 54 and a bottom wall 56. An outer seal lip 58 and an inner seal lip 60, respectively extend from ends of the outer side wall 52 and the inner side wall 54 obliquely in an interior space of the main body. And the outer seal lip 58 and the inner seal lip 60 provide a seal against the door glass 10.

The trim section 50 has a generally U-shaped cross-section, and includes a side wall 62 formed integrally with the bottom wall 56 of the glass run section 48, a side wall 64 formed on the side of a vehicle body, and a bottom wall 66. A seal lip 68 extends from the side wall 64 for contacting and sealing the door opening portion 44 when the vehicle door 12 is closed. Since no metal insert is used, the outer side wall 52, the bottom wall 56, the side walls 62, 64 and the bottom wall 66 are composed of a hard synthetic resin. And in order to improve the appearance, a shining film may be bonded to the outer side wall 52, the side wall 64 and the bottom wall 66 (see Japanese patent application laid-open No. 2010-18130, for example).

In this case, the glass run 46, however, exhibits a great rigidity in portions composed of a hard synthetic resin so that, upon the bending of the glass run 46 along curved surfaces of an upper side of the door frame 18, wrinkles, waviness or other defects may occur in the shining film on greatly curved areas thereof.

SUMMARY OF THE INVENTION

It is an object of the present invention to provide a glass run that is readily attached to a door frame of a sashless door-type motor vehicle in conformity with a configuration thereof without generating any deformation or waviness.

In order to achieve the above-described object, according to a first aspect of the present invention, a glass run adapted to be attached to a door frame of a vehicle door for providing a seal between a door opening portion and the vehicle door, includes a glass run section adapted to be attached to an inner periphery of the door frame, a trim section adapted to be attached to an end of the door frame, and a molding section adapted to integrally join the trim section and the glass run section to each other.

The glass run section is formed of a soft material by extrusion, and has an outer side wall, an inner side wall and a bottom wall with a generally U-shaped cross-section. An outer seal lip and an inner seal lip respectively extend from ends of the outer side wall and the inner side wall obliquely in an interior space of the glass run section having a generally U-shaped cross-section.

The trim section is formed of a hard material by extrusion into a generally U-shaped cross-section, and has a side wall located on the side of the glass run section, a side wall located on the side of a vehicle body, and a bottom wall.

The molding section is formed of a hard material by injection molding into a generally T-shaped cross-section, and includes a head part located on an exterior side surface of the door frame, and a leg part extending from an interior surface of the head part.

Upon the injection molding of the molding section, the bottom wall of the trim section and the outer side wall of the glass run section are integrally joined to the interior surface of the head part of the molding section, while sandwiching the leg part of the molding section such that the side wall of the trim section, which is located on the side of the glass run section, is integrally joined to one side surface of the leg part, whereas the bottom wall of the glass run section is integrally joined to the other side surface of the leg part.

With the arrangement of the first aspect of the present invention, the glass run includes a glass run section adapted to be attached to an inner periphery of the door frame, a trim section adapted to be attached to an end of the door frame, and a molding section adapted to integrally join the trim section and the glass run section to each other. Therefore, the glass run section, the trim section and the molding section can be separately formed using different materials, whereby each section can be readily formed into desired configurations. Then, these sections are integrally joined to each other so that the glass run having a complicated configuration can be readily formed. In addition, the section exhibiting flexibility and the section exhibiting rigidity can be prepared using proper materials.

The glass run section is formed of a soft material by extrusion, and has an outer side wall, an inner side wall and a bottom wall with a generally U-shaped cross-section. An outer seal lip and an inner seal lip respectively extend from ends of the outer side wall and the inner side wall obliquely in an interior space of the glass run section having a generally U-shaped cross-section. Therefore, an end edge of a door glass slides in the interior space of the glass run section with a generally U-shaped cross-section, which is defined with the outer side wall, the inner side wall and the bottom wall, and consequently, can be held therewith. The glass run section is formed of a soft material so as to flexibly bend, whereby the outer seal lip and the inner seal lip contact the end edge of the door glass to provide a seal between the door glass and the door frame.

The trim section is formed of a hard material by extrusion, and has a side wall located on the side of the glass run section, a side wall located on the side of a vehicle body, and a bottom wall, thereby defining a generally U-shaped cross-section. With this arrangement, a flange extending along an end of the door frame can be held with the trim section, whereby the glass run can be attached to the door frame.

The molding section is formed of a hard material by injection molding, and has a head part located on an exterior side surface of the door frame, and a leg part extending from an interior surface of the head part, thereby defining a generally T-shaped cross-section. With this arrangement, the head part can define a design surface on the exterior side surface of the door frame, thereby improving the appearance therearound. The leg part holds the head part and joins the glass run section and the trim section to each other. Since the glass run does not have any metal insert, the weight of the glass run can be decreased, thereby contributing to the reduction of the weight of the vehicle body.

Upon the injection molding of the molding section, the bottom wall of the trim section and the outer side wall of the glass run section are integrally joined to the interior surface of the head part of the molding section, while sandwiching the leg part of the molding section, such that the side wall of the trim section, which is located on the side of the glass run section, is integrally joined to one side surface of the leg part, whereas the bottom wall of the glass run section is integrally joined to the other side surface of the leg part, which is located on the side of the vehicle body. With this arrangement, the glass run can be formed by separately preparing the glass run section and the trim section, respectively bending them to conform to the configuration of the door frame, and joining them to each other integrally with the molding section exhibiting rigidity such that the entire configuration of the glass run conforms to that of the door frame.

The rigidity of the outer side wall and the bottom wall of the glass run section is increased by virtue of the molding section to improve the holding force of the glass run against the door glass. As a result, when the door glass shifts towards the exterior side of the vehicle body when the vehicle is running at high speeds, the shifting of the door glass can be restrained. In addition, when the door glass is raised to contact the bottom wall of the glass run section, the deformation of the bottom wall and the other portions of the glass run section can be prevented.

According to a second aspect of the present invention, a projection adapted to be engaged with the door frame is formed on an end of the side wall of the trim section, which is located on the side of the glass run section, or an exterior surface of the bottom wall of the glass run section, which is located on the side of the inner side wall thereof.

With the arrangement of the second aspect of the present invention, since the projection adapted to be engaged with the door frame is formed on an end of the side wall of the trim section, which is located on the side of the glass run section, or an exterior surface of the bottom wall of the glass run section, which is located on the side of the inner side wall thereof, the projection engages with a step provided in the flange of the door frame when the glass run is attached to the door frame, thereby preventing the trim section from coming off the flange of the door frame.

According to a third aspect of the present invention, seal lips adapted to contact the door opening portion when the door is closed, project from an exterior surface of the side wall of the trim section, which is located on the side of the vehicle body.

With the arrangement of the third aspect of the present invention, since the seal lips adapted to contact the door opening portion when the door is closed, project from an exterior surface of the side wall of the trim section, which is located on the side of the vehicle body, the seal lips can provide a seal between the door opening portion and the door frame when the door is closed.

According to a fourth aspect of the present invention, an engaging lip adapted to be engaged with the door frame projects from an end of the side wall of the trim section, which is located on the side of the vehicle body.

With the arrangement of the fourth aspect of the present invention, since the engaging lip adapted to be engaged with the door frame projects from an end of the side wall of the trim section, which is located on the side of the vehicle body, the engaging lip is engaged with a base of the flange of the door frame, thereby preventing the trim section from coming off the flange of the door frame.

According to a fifth aspect of the present invention, a decoration member is provided on an exterior surface of the head part of the molding section.

With the arrangement of the fifth aspect of the present invention, since the decoration member is provided on an exterior surface of the head part of the molding section, the decoration member provided on the exterior surface of the head part of the molding section can define a design surface of an outer side surface of the door frame, thereby improving the appearance therearound. By selecting the material as the decoration member, the design surface matching with the vehicle body can be formed.

According to a sixth aspect of the present invention, a glass run section adapted to be attached to a vertical side of the door frame, is further joined to the glass run.

With the arrangement of the sixth aspect of the present invention, since the glass run section adapted to be attached to a vertical side of the door frame, is further joined to the glass run, not only an upper side of the door frame but also a vertical side of a side edge of the door glass can be held with the glass run section and sealed therewith.

According to a seventh aspect of the present invention, the glass run section is formed of a thermoplastic olefin elastomer, whereas the trim section and the molding section are formed of an olefin synthetic resin, With the arrangement of the seventh aspect of the present invention, since the glass run section is formed of a thermoplastic olefin elastomer, it exhibits flexibility so as to contact and seal the door glass in accordance with the rising and lowering thereof. Since the trim section and the molding section are formed of an olefin synthetic resin, they exhibit rigidity so as to be attached to the door frame while holding the same. All of these sections are composed of materials of an olefinic system to exhibit excellent weather resistance and facilitate recycling thereof.

According to an eighth aspect of the present invention, in a method for producing a glass run adapted to be attached to a door frame of a vehicle door for providing a seal between a door opening portion of a vehicle body and the vehicle door, a glass run section adapted to be attached to an inner periphery of the door frame, a trim section adapted to be attached to an end edge of the door frame, and a molding section adapted to integrally join the trim section and the glass run section to each other, are respectively prepared, the glass run section is formed of a soft material by extrusion into such a configuration that an outer side wall, an inner side wall and a bottom wall define a generally U-shaped cross-section, and that an outer seal lip and an inner seal lip respectively extend from ends of the outer side wall and the inner side wall obliquely in an interior space of the glass run section with a generally U-shaped cross-section, the trim section is formed of a hard material by extrusion into such a configuration that a side wall located on the side of the glass run section, a side wall located on the side of a vehicle body, and a bottom wall define a generally U-shaped cross-section, the glass run section and the trim section are respectively cut to have a predetermined length, and respectively placed in an injection mold adapted to mold the molding section, and the molding section including a head part located on an exterior side surface of the door frame, and a leg part extending from an interior surface of the head part with a generally T-shaped cross-section, is formed by injection molding using the injection mold such that upon injection molding, the bottom wall of the trim section and the outer side wall of the glass run section are integrally joined to the interior surface of the head part of the molding section, the side wall of the trim section, which is located on the side of the glass run section, is integrally joined to one of side surfaces of the leg part, and the bottom wall of the glass run section is integrally joined to the other side wall of the leg part.

With the arrangement of the eighth aspect of the present invention, the glass run section adapted to be attached to an inner periphery of the door frame, the trim section adapted to be attached to an end edge of the door frame, and the molding section adapted to integrally join the trim section and the glass run section to each other, are respectively prepared. Therefore, the glass run section, the trim section and the molding section can be separately produced using different materials into different configurations. Then, these sections are integrally assembled so that a complicated configuration of the glass run can be readily produced. In addition, the sections exhibiting flexibility and the sections exhibiting rigidity can be produced by selecting suitable materials.

The glass run section is formed of a soft material by extrusion into such a configuration that an outer side wall, an inner side wall and a bottom wall define a generally U-shaped cross-section and that an outer seal lip and an inner seal lip respectively extend from tip ends of the outer side wall and the inner side wall obliquely in an interior space of the glass run section with a generally U-shaped cross-section. Therefore, the outer side wall, the inner side wall and the bottom wall, the outer seal lip and the inner seal lip can be simultaneously formed by extrusion. When the end edge of the door glass slides in the interior space of the glass run section with a generally U-shaped cross-section, the glass run section composed of a soft material can flexibly bend. In addition, the outer seal lip and the inner seal lip contact the end edge of the door glass, thereby providing the glass run section capable of sealing a gap between the door glass and the door frame.

The trim section can be formed of a hard material by extrusion into such a configuration that one side wall located on the side of the glass run section, the other side wall located on the side of a vehicle body, and a bottom wall define a generally U-shaped cross-section. Therefore, the side walls and the bottom wall can be simultaneously produced by extrusion. In addition, the trim section exhibiting high rigidity can hold the flange provided along an end edge of the door frame, whereby the glass run can be attached to the door frame.

The glass run section and the trim section are respectively cut to have a predetermined length, and respectively placed in an injection mold adapted to mold the molding section. Therefore, the glass run section and the trim section, each being formed by extrusion, can be respectively placed in the injection mold while being bent into a desired configuration, respectively, and upon the injection molding of the molding section, these sections are integrally joined to the molding section composed of a hard synthetic resin, thereby providing a glass run that is bent into a desired configuration to conform to curved surfaces of the door frame.

The molding section including a head part located on an exterior side surface of the door frame, and a leg part extending from an interior surface of the head part and having a generally T-shaped cross-section is formed by injection molding using the injection mold. Therefore, the molding section can be produced such that the head part defines a design surface on the exterior surface of the door frame to improve the appearance therearound, and the leg part can hold the head part and join the glass run section and the trim section to each other.

Upon injection molding, the bottom wall of the trim section and the outer side wall of the glass run section are integrally joined to the interior surface of the head part of the molding section, the side wall of the trim section, which is located on the side of the glass run section, is integrally joined to one of side surfaces of the leg part, and the bottom wall of the glass run section is integrally joined to the other side wall of the leg part. Therefore, the glass run section and the trim section, which are separately formed, are bent into a predetermined configuration, respectively, and joined integrally with the molding section into a configuration conforming to the configuration of the door frame. As a result, there can be produced the glass run capable of increasing the rigidity of the outer side wall and the bottom wall of the glass run section by virtue of the molding section, and consequently improving a holding force against the door glass.

Since the glass run includes the glass run section formed by extrusion, and adapted to be attached to an inner periphery of the door frame, the trim section formed by extrusion and adapted to be attached to an end edge of the door frame, and the molding section formed by injection molding and adapted to integrally join the trim section and the glass run section to each other, the glass run section, the trim section and the molding section are separately formed using different materials, and consequently, they can be joined integrally to conform to the configuration of the door frame. The bottom wall of the trim section and the outer side wall of the glass run section can be integrally joined to the interior surface of the head part of the molding section while sandwiching the leg part of the molding section, and the side wall of the trim section, which is on the side of the glass run section, can be integrally joined to one side surface of the leg part, whereas the bottom wall of the glass run section can be integrally joined to the other side surface of the leg part.

Other objects, features, and characteristics of the present invention will become apparent upon the consideration of the following description and the appended claims with reference to the accompanying drawings, all of which form a part of this specification.

DETAILED DESCRIPTION OF THE PREFERRED EMBODIMENTS

Figure 1:
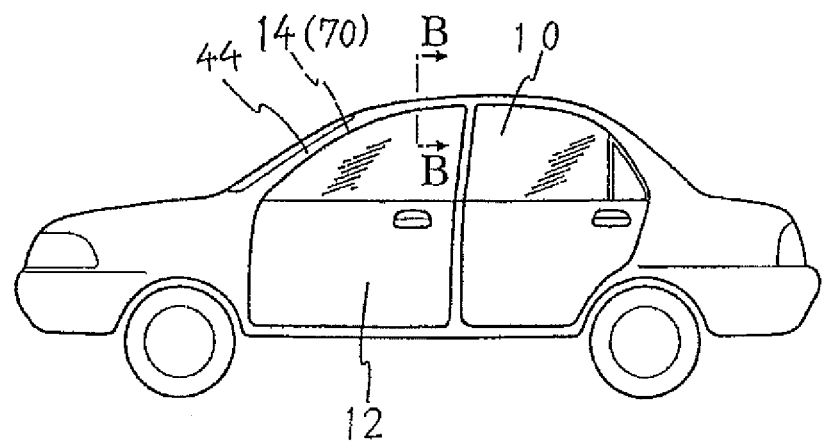
FIG. 1 is a side view of a motor vehicle.
Figure 2:
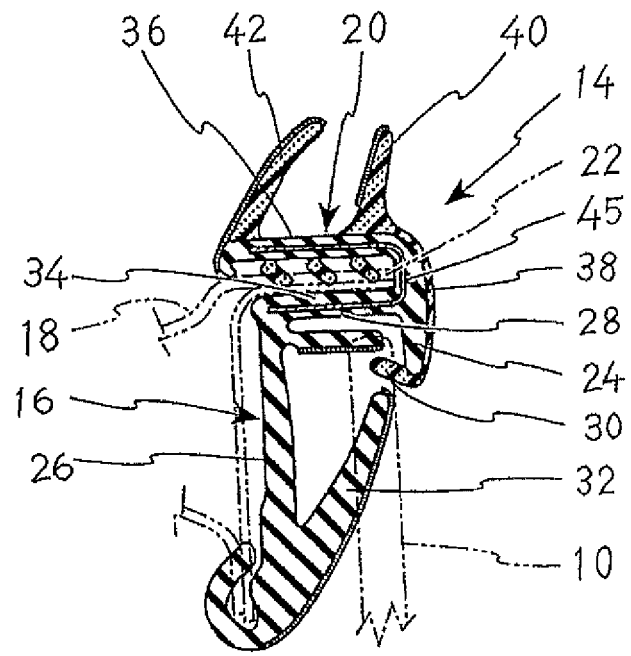
FIG. 2 is a cross-sectional view of a conventional glass run.
Figure 3:
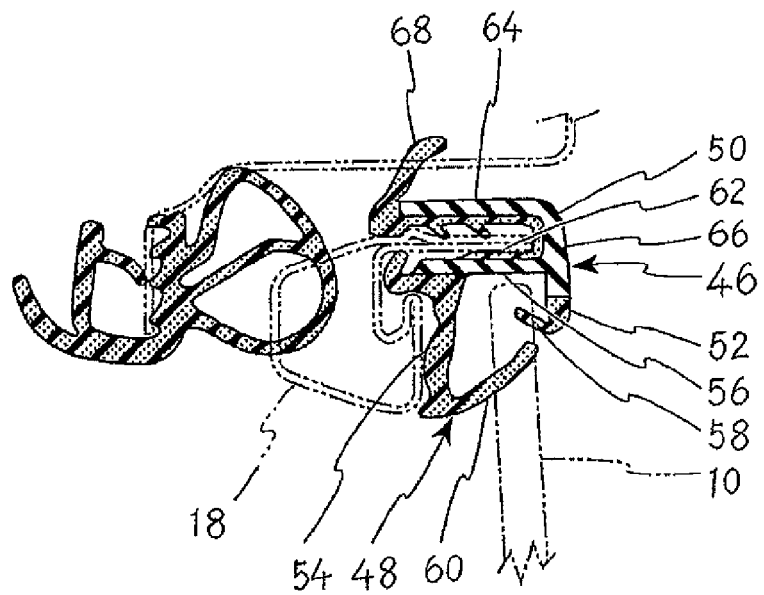
FIG. 3 is a cross-sectional view of another conventional glass run.

One embodiment of the present invention will be explained with reference to FIG. 1, and FIG. 4 through FIG. 7. FIG. 1 is a side view of a motor vehicle. As shown in FIG. 1, a glass run 70 in accordance with the present invention is used in a sashless door-type motor vehicle. An exterior part of the door sash is removed above the door belt line of a front door and a rear door of the motor vehicle, and only door glasses 10 are visible in an exterior side of the motor vehicle. The door glasses slide inwardly and outwardly of the front door and the rear door of the motor vehicle.

Figure 4:
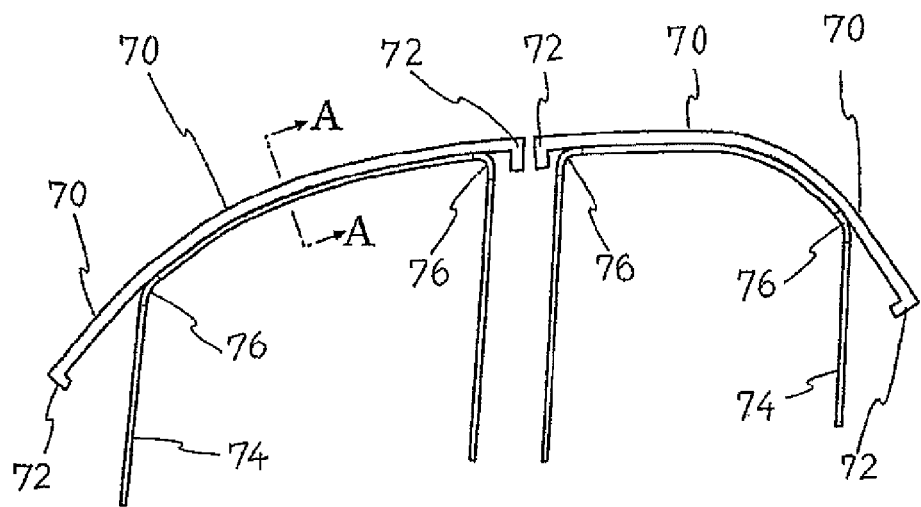
FIG. 4 is a front view of one embodiment of a glass run in accordance with the present invention.

As shown in FIG. 4, end sections 72 are provided at ends of the glass run 70.

Glass run sections 74 adapted to be attached to vertical sides of the door frame 18 are connected to front and rear corners 76 of the glass runs 70 so as to extend downwardly. Therefore, the vertical sides of the door frame 18 along with upper sides thereof can be held and sealed with the glass run sections 74. The front and rear corners 76 are formed by molding.

Figure 5:
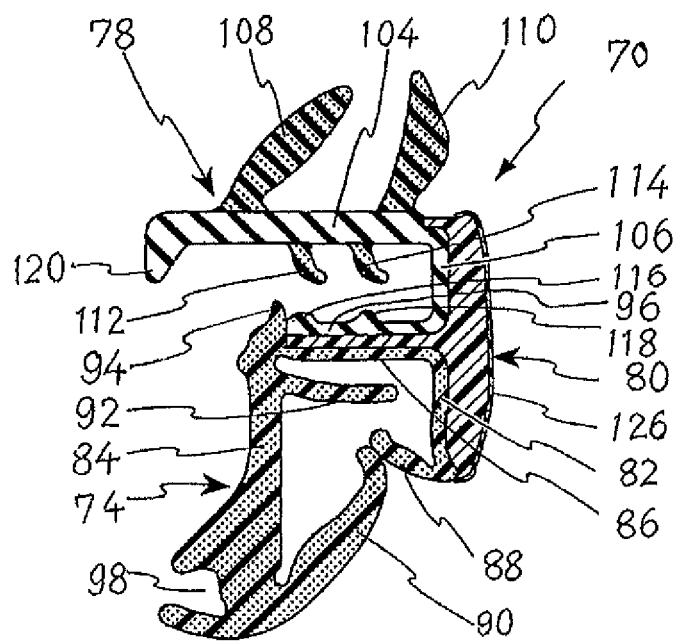
FIG. 5 is a cross-sectional view of one embodiment of a glass run in accordance with the present invention, which is taken along line A-A of FIG. 4.
Figure 6:
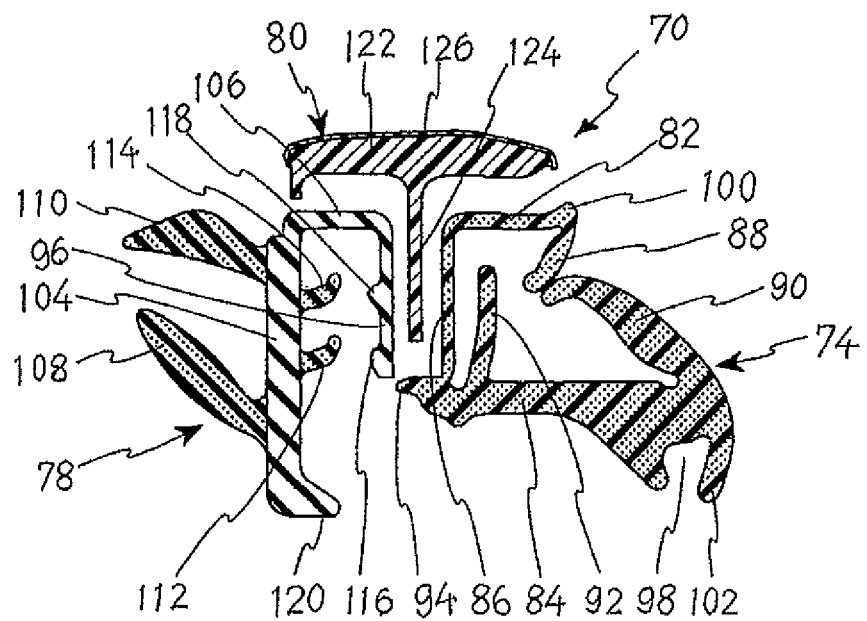
FIG. 6 is a cross-sectional view of a glass run section, a trim section and a molding section adapted to compose one embodiment of a glass run in accordance with the present invention.

As shown in FIG. 5 and FIG. 6, the glass run 70 includes the glass run section 74 adapted to be attached to an inner periphery of the door frame 18, the trim section 78 adapted to be attached to the flange 22 that is provided along an end of the door frame 18, and a molding section 80 adapted to integrally join the trim section 78 and the glass run section 74 to each other. First, the configurations of the glass run section 74, the trim section 78 and the molding section 80 will be explained. The entire configuration of the glass run 70 and the attachment of the glass run 70 to the door frame 18 will be explained later.

FIG. 5 illustrates the configurations of the glass run section 74, the trim section 78 and the molding section 80, which define the glass run 70.

The glass run section 74 has a main body with a generally U-shaped cross-section, which includes an outer side wall 82, an inner side wall 84 and a bottom wall 86. An outer seal lip 88 and an inner seal lip 90 respectively extend from ends of the outer side wall 82 and the inner side wall 84 obliquely in an interior space of the main body. Therefore, an end edge of the door glass 10 can slide in the interior space of the main body of the glass run section 74, which includes the outer side wall 82, the inner side wall 84 and the bottom wall 86, and can be held therein.

The glass run section 74 is composed of a soft material. Preferred examples of the soft material include a thermoplastic olefin elastomer. Since the soft material is used, the outer seal lip 88 and the inner seal lip 90 can flexibly bend. When the door glass 10 is raised, they can securely contact the end edge of the door glass 10 to provide a seal between the door glass 10 and the door frame 18.

In the case where an olefin synthetic resin is used as the trim section 78 and the molding section 80, they readily weld to the thermoplastic olefin elastomer of the glass run section 74, and recycling of the glass run is facilitated. Alternatively, thermoplastic olefin elastomer foams can be used.

It is preferable to increase the width and the thickness of the inner side wall 84 and the inner seal lip 90, as compared with those of the outer side wall 82 and the outer seal lip 88. In this case, when the door glass 10 is raised and inserted in the interior space of the glass run 70, the door glass 10 can be shifted outwardly to reduce the level difference in the exterior surface of the door 12, thereby improving the appearance therearound, and restraining the generation of wind noises.

It is preferable to apply a low sliding member to surfaces of the outer seal lip 88 and the inner seal lip 90, which are adapted to contact the door glass 10. Examples of the low sliding member include TPV (olefin thermoplastic vulcanized elastomer) exhibiting low sliding properties, which is formed into a thin film thereon, or silicon paints, urethane paints, etc. are painted thereon. With this arrangement, the door glass can be raised and lowered smoothly, and the generation of wind noises can be prevented.

A bottom lip 92 can be formed on an interior side of the bottom wall 86 so as to project from the joint between the inner side wall 84 and the bottom wall 86. When the door glass 10 is raised, an upper end edge of the door glass 10 contacts the bottom lip 92 to absorb shocks against the bottom wall 86. It is preferable to apply a low sliding member to surfaces of the bottom lip 92, too.

A projection 94 can be formed on an exterior side of the bottom wall 86 so as to project from a joint between the inner side wall 84 and the bottom wall 86 approximately perpendicularly to the bottom wall 86 in a direction perpendicular to the flange 22 of the door frame 18. In this case, when the glass run 70 is attached to the door frame 18, the projection 94 is held with a step provided in the vicinity of a base of the flange 22 of the door frame 18, thereby preventing the glass run 70 from coming off the flange 22. As described later, the projection 94 can be replaced with another projection provided in the trim section 78 so as to project from an end of a side wall 96 of the trim section 78, which is located on the side of the glass run section 74.

An attaching recess 98 is provided in an exterior surface of the inner side wall 84. When the glass run 70 is attached to the door frame 18, a protrusion provided in the door frame 18 is engaged with the attaching recess 98 to hold the inner side wall 84 of the glass run section 74.

An outer cover lip 100 and an inner cover lip 102 are respectively formed along the ends of the outer side wall 82 and the inner side wall 84 so as to extend outwardly of the interior space of the main body of the glass run section 74.

Next, the trim section 78 will be explained. The trim section 78 has a generally U-shaped cross-section, and includes the side wall 96 adapted to be joined to the bottom wall 86, a side wall 104 for facing the door opening portion 44, and a bottom wall 106. The flange 22 of the door frame 18 is inserted into an interior space of the trim section 78, and held therein, whereby the glass run 70 is attached to the door frame 18.

Figure 7:
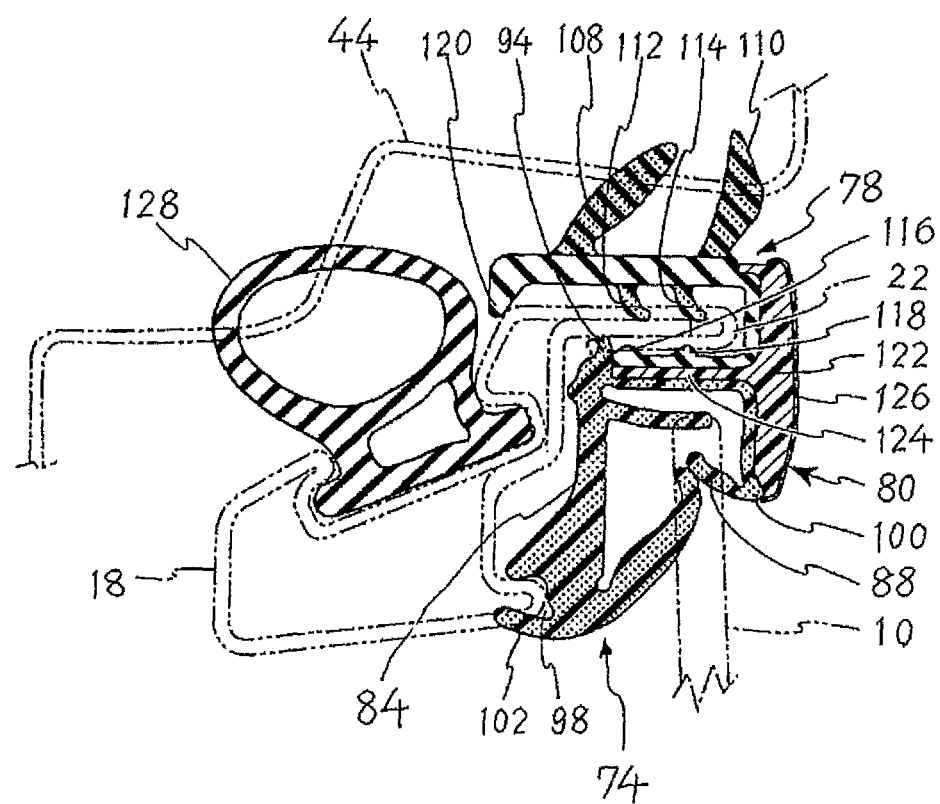
FIG. 7 is a cross-sectional view of one embodiment of a glass run in accordance with the present invention, which is taken along line B-B of FIG. 1.

A first seal lip 108 and a second seal lip 110 project from an exterior surface of the side wall 104 of the trim section 78, which faces the door opening portion 44. As shown in FIG. 7, when the door 12 is closed, the first seal lip 108 and the second seal lip 110 contact the door opening portion 44 to provide a double seal between the door opening portion 44 and the door frame 18.

A first holding lip 112 and a second holding lip 114 project from an interior surface of the side wall 104 of the trim section 78, whereas a first holding ridge 116 and a second holding ridge 118 project from an interior surface of the side wall 96 of the trim section 78. As shown in FIG. 7, when the flange 22 of the door frame 18 is inserted into the interior space of the trim section 78, one side surface of the flange 22 is held with the first holding lip 112 and the second holding lip 114, whereas the other side surface of the flange 22 is held with the first holding ridge 116 and the second holding ridge 118.

An engaging lip 120 projects from an end of the side wall 104 of the trim section 78 inwardly. As shown in FIG. 7, when the flange 22 of the door frame 18 is inserted into the interior space of the trim section 78, the engaging lip 120 contacts a bending base of the flange 22 to prevent the trim section 78 from coming off the flange 22.

The trim section 78 is arranged such that the side wall 96 on the side of the glass run section 74, the side wall 104 for facing the door opening portion 44, the bottom wall 106, the first holding ridge 116 and the second holding ridge 118 are composed of a hard material, whereas the first seal lip 108, the second seal lip 110, the first holding lip 112 and the second holding lip 114 are composed of a soft material. The trim section 78 is formed by simultaneously extruding the hard material and the soft material.

As a result, the main body of the trim section 78 exhibits high rigidity so as to hold the flange 22 securely. The first seal lip 108 and the second seal lip 110 flexibly bend to conform to the configuration of the door opening portion 44 and contact the same to provide a seal thereagainst. And the first holding lip 112 and the second holding lip 114 flexibly contact the flange 22 to provide a seal thereagainst.

Next, the molding section 80 will be explained. The molding section 80 has a generally T-shaped cross section, and includes a head part 122 located on an exterior side of the door frame 18, and a leg part 124 extending from a rear surface (interior surface) of the head part 122. A decoration member can be bonded to an exterior surface 126 of the head part 122. Examples of the decoration member include a brightness film and a pattern film. In this case, the exterior surface 126 of the head part 122 can define an aesthetic surface decorating the exterior surface of the door frame to improve the appearance thereof.

The head part 122 and the leg part 124 of the molding section 80 are formed simultaneously by injection molding. The molding section 80 is composed of a hard material so that, as described later, the molding section 80 can strongly join the glass run section 74 and the trim section 78 upon the injection molding of the molding section 80, whereby the configuration of the glass run can be kept by virtue of the high rigidity of the molding section 80.

Next, the arrangement in which the glass run section 74 and the trim section 78 are joined with the molding section 80 will be explained.

As described above, the glass run section 74 and the trim section 78 are joined to each other by welding them with heat of a molten synthetic resin adapted to form the molding section 80 by injection molding.

As shown in FIG. 5, the bottom wall 86 of the glass run section 74 is joined to the leg part 124 on the side of the door glass 10 (the lower side of the leg part 124 in FIG. 5), whereas the outer side wall 82 is joined to the rear surface of the head part 122 on the side of the door glass 10 (the lower side of the leg part 124 in FIG. 5). Therefore, even when the door glass 10 is shifted outwardly, the outer side wall 82 held with the head part 122 can prevent the movement of the door glass 10. In addition, even when the upper end edge of the door glass 10 contacts the bottom wall 86 of the glass run section 74, the deformation of the glass run section 74 can be prevented.

The trim section 78 is arranged such that the side wall 96 on the side of the glass run section 74 is joined to the leg part 124 on the side of the door opening portion 44 (the upper side of the leg part 124 in FIG. 5), whereas the bottom wall 106 is joined to the rear surface of the head part 122 on the side of the door opening portion 44 (the upper side of the leg part 124 in FIG. 5). Namely, the bottom wall 106 is integrally joined to the rear surface of the head part 122 on the side of the door opening portion 44 (the upper side of the leg part 124 in FIG. 5), whereas the outer side wall 82 of the glass run section 74 is integrally joined to the rear surface of the head part 122 on the side of the door glass 10 (the lower side of the leg part 124 in FIG. 5) while sandwiching the leg part 124.

Therefore, the side wall 96 on the side of the glass run section 74 and the bottom wall 106 are strongly held with the molding section 80, whereby the flange 22 of the door frame 18 can be securely held with the trim section 78, and the outer side wall 82 and the bottom wall 86 of the glass run section 74 can hold the end edge of the door glass 10.

Next, the arrangement in which the glass run 70 in the present embodiment is attached to the door frame 18 will be explained with reference to FIG. 7.

Panels composing the door frame 18 are bent along end edges thereof to define the flange 22. The flange 22 bends at its base and extends in a horizontal direction. The door frame 18 has a recess in an upper surface thereof so as to face the door opening portion 44 inwardly of the flange 22, and a door weather strip 128 is attached in this recess. When the door 12 is closed, the door weather strip 128 contacts the door opening portion 44 to improve the sealing properties between the door frame 18 and the door opening portion 44 along with the first seal lip 108 and the second seal lip 110

The flange 22 of the door frame 18 is inserted in the interior space of the trim section 78 with a generally U-shaped cross-section. The flange 22 is held with the trim section 78 such that the first holding lip 112 and the second holding lip 114 contact an upper surface (in FIG. 7) of the flange 22, whereas the first holding ridge 116 and the second holding ridge 118 contact a lower surface (in FIG. 7) of the flange 22.

The projection 94 formed in the bottom wall 86 is held with a step defined in the vicinity of the base of the flange 22 of the door frame 18, at which the panels of the door frame 18 are bent, thereby preventing the flange 22 from coming off the trim section 78. At this time, the engaging lip 120 formed in the side wall 104 of the trim section 78 contacts the bending base of the flange 22 to prevent the flange 22 from coming off the trim section 78.

The glass run section 74 is attached on the lower side of the flange 22. When the door glass 10 is raised and lowered, it slides into and out of the interior space of the glass run section 74 with a generally U-shaped cross section.

A protrusion provided in the door frame 18 is inserted in the attaching recess 98 of the inner side wall 84 of the glass run section 74 to hold the inner side wall 84. The inner cover lip 102 contacts the protrusion of the door frame 18 to improve the appearance of the lower side of the door frame 18

The outer cover lip 100 extends from the end of the outer side wall 82 so as to cover an end edge of the head part 122 of the molding section 80. The outer cover lip 100 and the outer seal lip 88 are continuously formed, and joined to a lower side edge of the exterior surface 126 of the head part 122 to improve the appearance around the end of the outer side wall 82.

The exterior surface 126 of the molding section 80 is located on the exterior side of the door frame 18, and covers exterior surfaces of the flange 22 and the glass run 70 to improve the appearance of the door frame 18.

In order to integrally join the glass run section 74, the trim section 78 and the molding section 80, the glass run section 74 and the trim section 78, which have become hard by cooling after extrusion, are cut to have a predetermined length, respectively, and placed in an injection mold adapted to form the molding section 80. At this time, the glass run section 74 and the trim section 78 which have been formed by extrusion are placed in a cavity of the injection mold while being bent into a predetermined configuration, respectively. And, upon the injection molding of the molding section 80, they are integrally joined to the molding section 80 composed of a hard synthetic resin, whereby the glass run 70 with a predetermined bending configuration can be obtained.

Upon producing the glass run 70, a thermoplastic elastomer or a soft synthetic resin is used as the soft members, which are composed of a solid material or a sponge material. Examples of the thermoplastic elastomer include an olefin elastomer, and examples of the soft synthetic resin include a soft vinyl chloride. And an olefin synthetic resin such as polypropylene resin, polyethylene resin, etc. is used as the hard members of the glass run 70.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run adapted to be attached to a door frame of a vehicle door for providing a seal between a door opening portion and the vehicle door, the glass run comprising:
   a glass run section adapted to be attached to an inner periphery of the door frame;
   a trim section adapted to be attached to an end of the door frame; and
   a molding section adapted to integrally join said trim section and said glass run section to each other,
   wherein said glass run section comprises an extruded soft material, and includes a glass run section outer side wall, a glass run section inner side wall, and a glass run section bottom wall such that said glass run section has a generally U-shaped cross-section,
   wherein an outer seal lip and an inner seal lip respectively extend from ends of said glass run section outer side wall and said glass run section inner side wall obliquely in an interior space of said glass run section,
   wherein said trim section comprises an extruded hard material, and includes a trim section first side wall located on a side of said glass run section, a trim section second side wall located on a side of a vehicle body, and a trim section bottom wall such that said trim section has a generally U-shaped cross-section,
   wherein said molding section comprises an injected molding hard material, and includes a head part located on an exterior side surface of the door frame, and a leg part extending from an interior surface of said head part with a generally T-shaped cross-section,
   wherein said trim section bottom wall of said trim section and said glass run section outer side wall of said glass run section are integrally joined to said interior surface of said head part of said molding section, while sandwiching said leg part of said molding section, upon the injection molding of said molding section, said trim section first side wall of said trim section, which is located on the side of said glass run section, is integrally joined to a first side surface of said leg part, whereas said glass run section bottom wall of said glass run section is integrally joined to a second side surface of said leg part,
   wherein an entire configuration of the glass run conforms to a configuration of the door frame,
   wherein the glass run section further comprises a projection adapted to be engaged with the door frame,
   wherein the projection is located at an exterior surface of said glass run section bottom wall located on a side of said glass run section inner side wall, and
   wherein the projection contacts a distal end of the trim section first side wall and a distal end of the leg part.

2. A glass run as claimed in claim 1, wherein seal lips adapted to contact the door opening portion when the door is closed, project from an exterior surface of said trim section second side wall of said trim section, which is located on the side of the vehicle body.

3. A glass run as claimed in claim 1, wherein an engaging lip adapted to be engaged with the door frame projects from an end of said trim section second side wall of said trim section, which is located on the side of the vehicle body.

4. A glass run as claimed in claim 1, wherein a decoration member is provided on an exterior surface of said head part of said molding section.

5. A glass run as claimed in claim 1, wherein said glass run section comprises a thermoplastic olefin elastomer, whereas said trim section and said molding section comprise an olefin synthetic resin.

6. A glass run as claimed in claim 1, wherein the projection is located
   on an exterior side of said glass run section bottom wall to project from a joint between said glass run section inner side wall and said glass run section bottom wall perpendicular to said glass run section bottom wall in a direction perpendicular to a flange of the door frame.

7. A glass run as claimed in claim 6, wherein, when the glass run is attached to the door frame, the projection is held with a step provided in a vicinity of a base of the flange of the door frame to prevent the glass run from coming off the flange.

8. A glass run as claimed in claim 6, wherein the glass run section further comprises:
   a bottom lip located on an interior side of said glass run section bottom wall to project from the joint between said glass run section inner side wall and said glass run section bottom wall to absorb shocks against said glass run section bottom wall.

9. A glass run as claimed in claim 1, wherein the glass run section further comprises:
   a bottom lip located on an interior side of said glass run section bottom wall to project from a joint between said glass run section inner side wall and said glass run section bottom wall to absorb shocks against said glass run section bottom wall.

10. A glass run as claimed in claim 1, wherein the glass run section further comprises:
    an outer cover lip that extends from an end of said glass run section outer side wall to cover an end edge of the head part of the molding section.

11. A glass run as claimed in claim 10, wherein the outer cover lip is joined to a lower side edge of an exterior surface of the head part such that an uppermost surface of the outer cover lip is located below an uppeiniost surface of the head part.

\* \* \* \* \*